Dec. 6, 1955 A. E. CHELGREN ET AL 2,726,334

FREQUENCY-SELECTIVE ELECTRICAL NETWORK

Filed May 23, 1951 3 Sheets-Sheet 1

*INVENTORS*
ARVID E. CHELGREN
JOHN F. BELL
LLOYD E. MATTHEWS
BY Francis W. Crotty
THEIR ATTORNEY Dec. 6, 1955 A. E. CHELGREN ET AL 2,726,334

FREQUENCY-SELECTIVE ELECTRICAL NETWORK

Filed May 23, 1951 3 Sheets-Sheet 2

ARVID E. CHELGREN
JOHN F. BELL
LLOYD E. MATTHEWS
*INVENTORS.*

BY Francis W. Crotty

THEIR ATTORNEY

ARVID E. CHELGREN
JOHN F. BELL
LLOYD E. MATTHEWS
*INVENTORS.*

BY Francis W. Crotty

THEIR ATTORNEY

United States Patent Office 2,726,334

Patented Dec. 6, 1955

2,726,334

FREQUENCY-SELECTIVE ELECTRICAL NETWORK

Arvid E. Chelgren, Elmhurst, John F. Bell, Glenview, and Lloyd E. Matthews, Chicago, Ill., assignors to Zenith Radio Corporation, a corporation of Illinois Application May 23, 1951, Serial No. 227,834

5 Claims. (Cl. 250—40)

This invention relates to a novel frequency-selective electrical network and more particularly to such a network adapted to be employed in the signal-selecting or tuner portion of a wave-signal receiver. Although the invention is useful in a variety of environments, it is especially suited for use in a wave-signal receiver of the superheterodyne type and for convenience will be described in that connection.

It is expected that frequency allocations for television service will be established in the range of frequencies from approximately 500 mcs. to 1000 mcs. and in all probabilities between 42 and 69 channels will occupy a range of 425 mcs. This large number of channels and their extreme frequency range imposes many problems in tuner design. Specifically, these include accurate tuning and proper tracking over the entire range in order to assure efficient operation of the receiver on each channel.

In constructing a superheterodyne receiver for the new television band, it has been found desirable to omit radio-frequency amplification and to utilize a crystal mixer in place of the usual electron tube converter. This is understandable because of the complexity and great expense of electron tubes that are efficiently operable at frequencies within the contemplated television range. In order to provide a sufficient degree of selectivity and image rejection, the input circuit of the receiver comprises two, tunable, resonant or selector circuits connected in cascade. These circuits include inductance and capacitance and are electrically coupled together by a common, conductive coupling impedance. Substantially no magnetic or capacitive coupling is employed so that the required selectivity is maintained over the entire tuning range.

It has been found desirable to maintain the junction of the coupling impedance with the capacitances of the resonant circuits at ground potential. Consequently, if conventional coupling arrangements are employed for supplying input signals to one of the inductances and for deriving output signals from the other, the impedance of the source and that of the load are shunted across the common coupling impedance. Since these impedances usually contain a capacitive component, the conductive nature of the coupling impedance is altered and the band width of the signal-selecting circuits may be adversely effected over portions of the operating frequency range.

It is an object of this invention, therefore, to provide a novel frequency-selective electrical network having a predetermined frequency-acceptance band.

A further object of this invention is to provide a novel frequency-selective electrical network that is continuously adjustable over an operating range of frequencies and which has a given frequency-acceptance band at any frequency within the operating range.

Another object of the invention is to provide a novel frequency-selective electrical network having a common coupling impedance for a pair of resonant circuits and means for supplying input signals to the network without adversely affecting the character of the coupling impedance.

It is a corollary object of the invention to provide a superheterodyne receiver for signals in the range of frequencies from approximately 500 mcs. to 1000 mcs. which is small in size, inexpensive to construct, and yet efficient in operation.

A frequency selective electrical network for utilizing radio frequency signals, in accordance with the invention, comprises first and second circuits each of which includes a principal inductance and a tuning capacitance. A lead-in conductor is coupled to the first of the circuits and is employed to apply radio-frequency signals to that circuit. A coupling impedance, including at least two sections each having an electrical length small relative to one-quarter of the wavelength of the applied signals, is provided. The first of the coupling impedance sections is conductively connected in series relationship between the first and second circuits, whereas the other impedance section is connected between the first section and a plane of reference potential. The coupling impedance comprises a continuous conductive element at least partially encompassing the lead-conductor.

The features of the present invention which are believed to be novel are set forth with particularity in the appended claims. The present invention itself, both as to its organization and manner of operation, together with further objects and advantages thereof may best be understood by reference to the following description taken in connection with the accompanying drawings in which:

Figure 1:
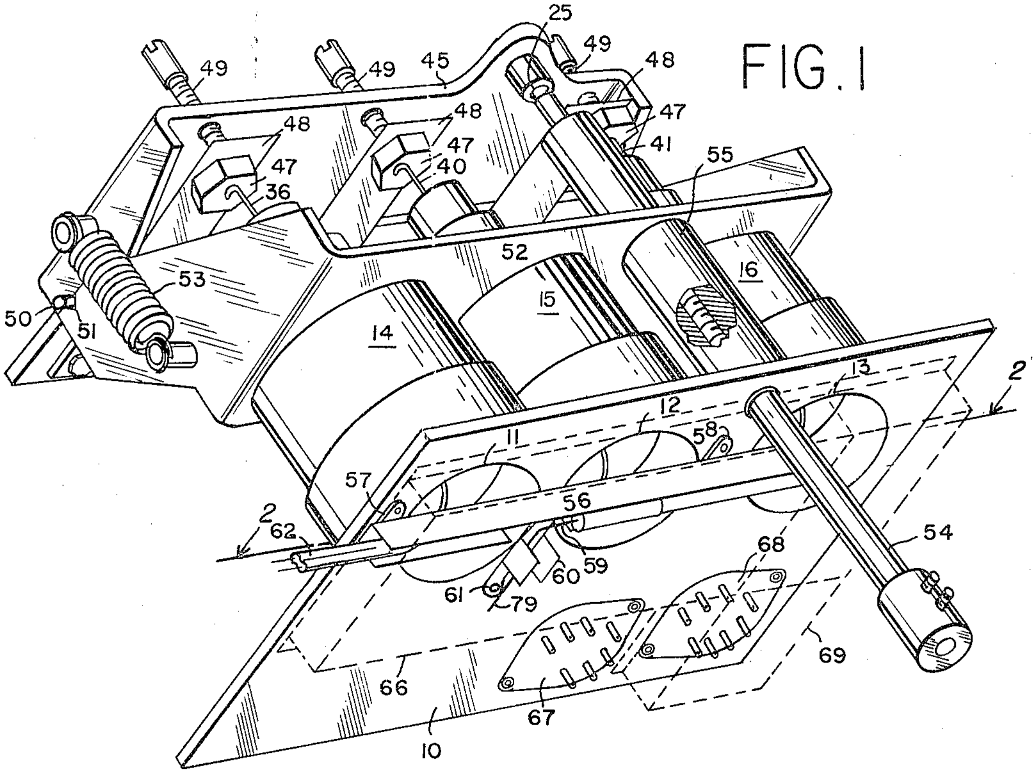
Fig. 1 is an isometric view of a complete tuner assembly for a superheterodyne type of wave-signal receiver incorporating the frequency-selective electrical network of the present invention.
Figure 2:
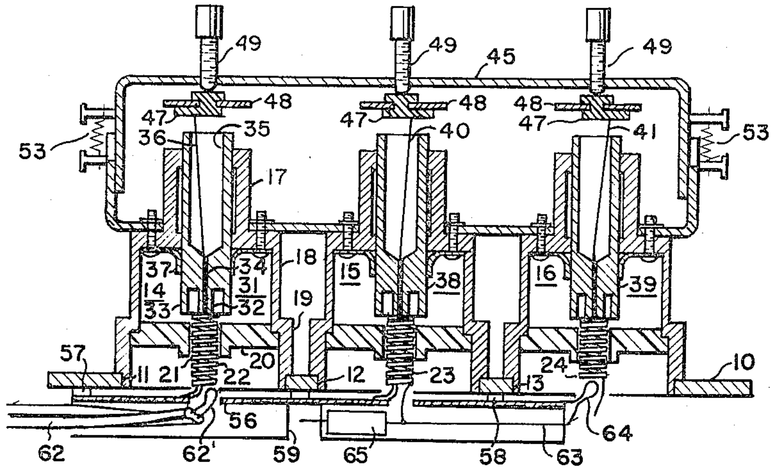
Fig. 2 is a sectional view taken along line 2—2 of Fig. 1.

With reference to Fig. 1, the tuner assembly there shown comprises a conductive mounting plate or chassis 10 on which are mounted the several elements of the frequency-selective electrical network in accordance with the invention. A series of circular openings 11, 12 and 13 are aligned in base 10 and a group of hollow, essentially tubular conductive shield members 14, 15 and 16 are positioned coaxially of the openings 11–13, extending upwardly from base 10. As shown in Fig. 2, each shield member includes three contiguous sections 17, 18 and 19 of progressively increasing diameters. The shield section 19 is provided with a shoulder portion at one end to be received by one of the openings in base 10 to which this portion is secured in a suitable manner, such as by soldering, in order to effect good mechanical and electrical contact between the shield and chassis. A disc shaped bushing 20 of electrically insulating material "Rexolite" #1422 for example, is secured within each shield at the upper extremity of section 19 and is provided with a centrally located aperture 21. A cylindrical coil projects through aperture 21 and extends beyond the upper and lower surfaces of bushing 20. The coils disposed within shields 14, 15 and 16 are designated 22, 23 and 24, respectively.

Coil 22 may be considered the principal inductance of the input circuit for the tuner and a cylindrical tuning element 31 of electrically conductive material in slidably disposed within upper section 17 of shield 14 in coaxial alignment with coil 22 for movement relative to the upper end thereof. The tuning element 31 in conjunction with coil 22 constitutes a variable condenser or tuning capacitance for the input circuit of the tuner. In operation, movement of the tuning element with respect to its associated coil is limited to substantially 30% of the axial length of the coil so that the over-all reactance variation for the resonant circuit so constituted is essentially only one of capacitance. A similar resonant circuit is disclosed in the copending application of Arvid E. Chelgren, Serial No. 146,845, filed February 28, 1950, now Patent No. 2,595,764 issued May 6, 1952, and assigned to the same assignee as the present application. The lower end of tuning element 31 is provided with a central portion 32 of a smaller diameter than the inner diameter of coil 22 and an outer cylindrical portion having an internal diameter greater than the external diameter of the coil. Consequently, upon movement of tuning element 31, the convolutions of coil 22 are received within the space defined by portions 32 and 33.

The movable tuning element is supported from a displaceable carriage, presently to be described, by a thin flexible wire 36 which may be a length of piano wire. To that end, tuning element 31 is provided with an internal bore 34 through which wire 36 may project for connection to the coil-end of element 31. The lower bore section 34 of element 31 is only slightly larger in diameter than wire 36, but the remaining bore section 35 which preferably extends for at least half the length of the tuning element, is of very much larger diameter to permit flexing of the wire as the occasion may require. An annular contact member 37 is provided to establish and maintain an efficient electrical connection between tuning element 31 and its shield 14. This member is constructed of a conductive material and is mechanically and electrically connected to the inner transverse wall of shield section 18. It has a centrally located cluster of resilient contact fingers surrounding and in electrical contact with the body of tuning element 31.

Similar tuning elements 38 and 39 are associated with the upper ends of coils 23 and 24 and are adjustably supported by individual flexible wires 40 and 41. The condenser formed by tuning element 38 and coil 23 is a tuning capacitance which together with the coil as a principal inductance constitutes a resonant circuit. As pointed out earlier, coil 22 and tuning element 31 define an input or first circuit for the tuner to which input signals at radio frequencies are applied. Insofar as such signals are concerned, coil 23 and tuning element 38 comprise an output or second circuit for the tuner. Additionally, tuning element 39 and coil 24 constitute a resonant circuit for a local oscillator.

Wires 36, 40 and 41 are connected to a carriage 45 movably disposed above shields 14–16 to gang tuning elements 31, 38 and 39 for simultaneous movement. The upper end of each wire is fixed to a head 47 rotatably mounted for eccentric movement in a plane parallel to carriage 45 and at one end of a leaf spring 48, the other end of which is connected to carriage 45. The lower ball-shaped end of a screw 49, threaded through an opening in the carriage, bears against the upper surface of spring 48 to maintain the spring and tuning element 31 in a preselected position with respect to the carriage, which position may be adjusted by rotation of the screw.

Carriage 45 is provided with a pair of pins 50 extending from side flanges but only one such pin appears in Fig. 1. The pins are disposed within notches 51 in the legs of a U-shaped bearing member 52 secured to shield members 14–16 and having openings to receive their upper sections 17. A pair of springs 53 bias carriage 45 clockwise (Fig. 1) about the pivots 50—51 and one end of a tuning shaft 54, threaded into a bushing 55 that extends transverse to the axis of the carriage between chassis 10 and member 52, engages a ball member 25 on the carriage to maintain the carriage against the bias of springs 53. Rotation of tuning shaft 54 in one direction advances carriage 45 toward bearing member 52 and rotation of the shaft in the other direction displaces the carriage in the opposite sense. With this adjustment the electrical circuits of the tuner are continuously adjustable over a range of operating frequencies. Since each mounting head 47 is eccentrically connected to spring 48, rotation of the head displaces its junction with the length of wire holding the conductive tuning element toward or from the pivotal axis of carriage 45 with the effect that each tuning element 31, 38 and 39 is connected to one end of a pivoted lever of adjustable length. This type of unicontrol mechanism is described in the copending application of Arvid E. Chelgren, Serial No. 202,227, filed December 22, 1950, now U. S. Patent No. 2,632,109, issued March 17, 1953 and assigned to the same assignee as the present application.

It is appropriate to point out that the shields 14, 15 and 16 magnetically and electrostatically shield coils 22, 23 and 24 from one another. Consequently, in order electrically to couple the first and second resonant circuits of the tuner and introduce leads thereto there is provided a conductive, elongated member 56 of U-shaped or channel cross section. Member 56 is disposed below base 10 along the line of openings 11—13, extending from one side of opening 11, across that opening to a point within opening 13. The channel member is mechanically and electrically coupled to base 10 by a conductive lug 57 adjacent opening 11 and by a second lug 58 positioned intermediate openings 12 and 13. A cut-out portion 59 in the side flange of the channel, intermediate openings 11 and 12, provides a lead outlet which continues through an extension 60 of similar channel configuration connected at one end to channel 56 and at its other end 61 to base 10.

As illustrated in Fig. 2, the lower extremities of coils 22 and 23 are electrically connected to the exterior surface of the bight portion of channel 56. Since the channel is electrically connected to chassis 10, there is thus provided a coupling impedance common to the first and second circuits of the tuner assembly to furnish coupling therebetween. The effective electrical length of each portion of member 56 which is between its connection to the chassis 10 and the coils is small relative to one-quarter of the operating wavelength of the assembly. The same is true of channel 60. In view of its configuration, specifically its U-shaped cross section, member 56 presents a concavity through which a parallel-wire type lead-in conductor 62 projects into coupled relation with coil 22 through a suitable opening in member 56, being connected to a coupling coil 62′ disposed adjacent the lower end of coil 22.

The frequency converter section of the tuning assembly includes, in addition to the tuned input and output circuits comprising coils 22 and 23, a non-linear, unidirectionally conductive device 65 which may take the form of a germanium crystal diode positioned within channel member 56. One terminal of the crystal projects through an opening in the channel into connection with a tap near the lower end of coil 23 while its other terminal is connected to an intermeditae frequency amplifier, presently to be described. Also connected to the first-mentioned terminal of diode 65 is a lead 63 which projects through channel 56 and is connected to one terminal of a pick-up loop 64 the other terminal of which is connected to the channel. Loop 64 projects into the field of coil 24 and serves to couple the local oscillator of the tuner with diode mixer 65.

A conductive box-like shield structure 66, shown in dash outline in Fig. 1, may be connected to the under side of base 10 to enclose and electrically shield a portion of coupling member 56, crystal 65 and so forth. A pair of tube sockets 67 and 68, mounted on base 10 outside the confines of shield 66, accommodate individual electron-discharge devices or vacuum tubes (not shown) which extend above chassis 10. These tubes may be connected in an intermediate-frequency amplifier and an oscillator circuit, respectively, as more fully described hereinafter. Another shield 69 encloses socket 68, the contiguous portions of the oscillator circuit, and the portion of main channel section 56 that is not enclosed by shield 66.

Figure 3:
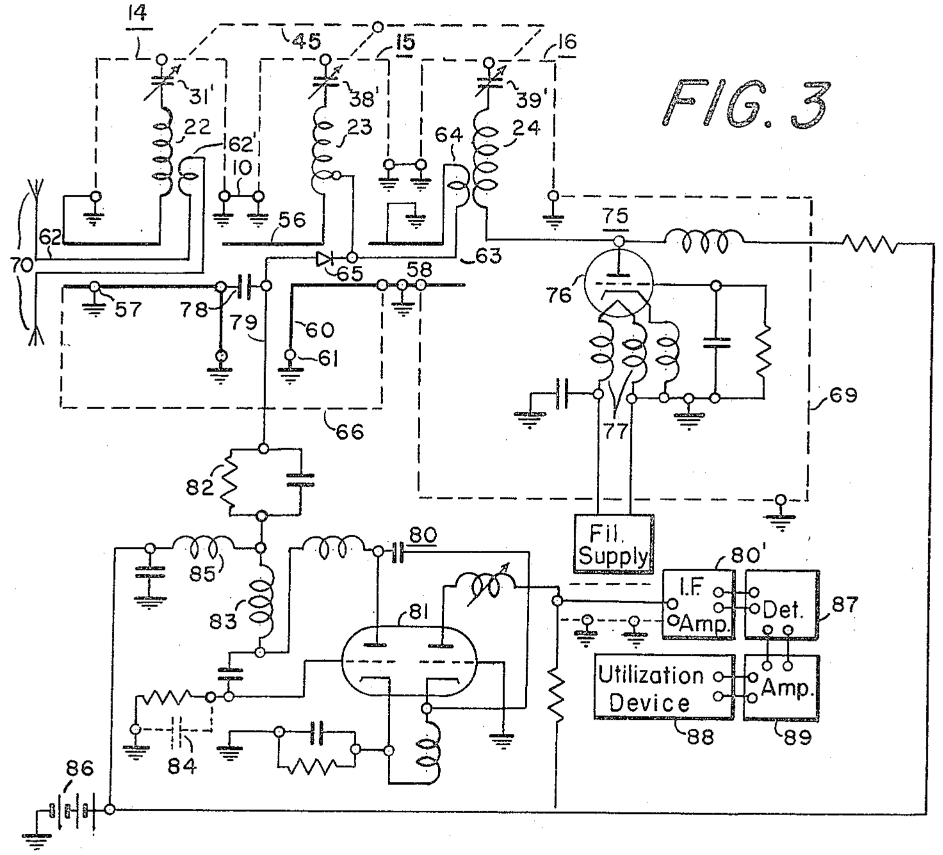
Fig. 3 shows schematically the electrical circuit for the tuner illustrated in Fig. 1 comprising a portion of a complete superheterodyne receiver, the remainder of which is shown by block diagram.

With reference now to Fig. 3, there is represented the electrical circuit diagram of a complete superheterodyne receiver including schematically the described tuner, with those elements illustrated in Figs. 1 and 2 identified by common reference numerals. The tuning condensers formed by the coils and their respective tuning elements are designated 31', 38' and 39'. Base 10 is grounded, and an antenna 70 is connected to the free extremity of cable 62. Connections from ground and the lower extremity of coil 24 couple resonant circuit 24, 39' with an oscillator 75 that includes a triode type of electron-discharge device 76 received by socket 68. The oscillator circuit is of the type described in the copending application of John F. Bell, Serial No. 164,784, filed May 27, 1950, now U. S. Patent No. 2,663,799, issued December 22, 1953 and assigned to the same assignee as the present application. The grid of tube 76 is grounded for radio-frequency signal voltages through a parallel connected condenser and resistor combination, whereas its cathode is maintained above ground potential by a tri-filar radio-frequency choke 77. The frequency-determining circuit of the oscillator includes, in parallel with coil 24, the series combination of the grid-plate capacitance of tube 76 and condenser 39'. Such an oscillator is ideally suited for operation over a wide range of frequencies in the ultra-high portion of the frequency spectrum but any other known type of oscillator may be employed.

One terminal of crystal rectifier 65 is connected to a tap of coil 23 and its other terminal is grounded by a condenser 78 having a high reactance for signal voltages of the intermediate-frequency but a low reactance for received signal frequencies. A conductor 79 connected to the junction of crystal 65 and condenser 78 is led by channel section 60 into coupled relation with a first intermediate-frequency amplifier 80 including a grid-driven triode stage coupled in cascade with a grounded-grid, cathode-driven triode stage. These two stages utilize a twin-triode electron-discharge device 81 accommodated by tube socket 67 of Fig. 1.

The input circuit for the first stage of intermediate-frequency amplifier 80 includes, in series relation with lead 79, a resistor 82 by-passed for intermediate-frequency signal voltages, and an inductor 83. The reactance of inductor 83 is selected to resonate with the input capacitance 84 of the first stage at the intermediate frequency. An inductor 85 coupled between the junction of elements 82 and 83 and ground resonates R. F. by-pass condenser 78 at the intermediate frequency. Thus diode 65 is effectively short-circuited for signals in the intermediate-frequency pass band, although intermediate frequency signals are supplied to amplifier 80.

A source 86 of B potential provides anode voltage for oscillator tube 76 and amplifier tube 81. In addition, a direct-current connection from source 86 through elements 85, and 82 of the input circuit of amplifier 80, lead 79 and crystal 65 to ground through the lower portion of coil 23, channel 56 and lugs 57 and 58 provides a constant current bias for the crystal. This type of biasing system is described in detail in the copending application of John F. Bell et al., Serial No. 200,457, filed December 12, 1950, now U. S. Patent No. 2,640,919, issued June 2, 1953 and assigned to the same assignee as the present application.

Intermediate-frequency amplifier 80 is connected in cascade to additional stages 80' of intermediate-frequency amplification, to a signal detector 87 and to a utilization device 88 through an amplifier 89 of one or more stages.

All of the components of this superheterodyne receiver succeeding amplifier 80 may be of conventional construction and the general operation of such a receiver is well understood in the art so that a detailed description thereof is unnecessary. In brief, however, a signal is intercepted by antenna circuit 70, selected by resonant circuit 22—31', further selected by resonant circuit 23—38', and applied to modulator 65 wherein it is heterodyned with the signal from local oscillator 75 and converted into an intermediate-frequency signal. This latter signal is amplified in intermediate-frequency amplifiers 80 and 80' and is applied to detector 87 wherein its modulation components are derived. These components, in turn, are applied to amplifier 89 wherein they are amplified and delivered to load circuit 88 for utilization.

Figure 4:
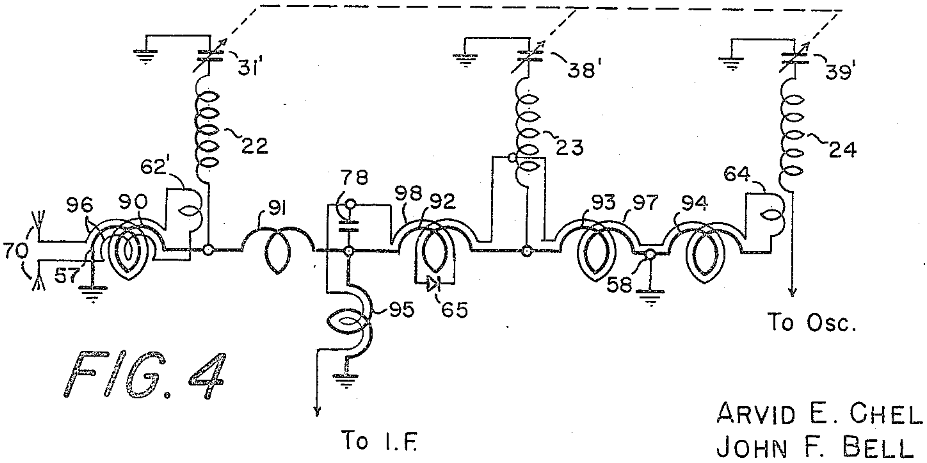
Fig. 4 represents an electrical circuit equivalent of a portion of the circuit shown in Fig. 1.

With reference to Fig. 4, the circuit there represented is the electrical equivalent of the input selector circuits of the frequency converter of Fig. 3, and is used to assist in correlating the mechanical and electrical details of the tuner structure embodying the present invention. The elements of Fig. 3 which appear in Fig. 4 are designated by like reference numerals. Channel 56 is represented by five series-connected inductors designated 90—94. The lower end of coil 22 is connected to the junction of inductors 90 and 91 and the lower end of coil 23 is connected to the junction of inductors 92 and 93. An inductor 95 connected between the junction of inductors 91 and 92 and ground represents the inductance of branch channel 60. Since line 62, lead 63 and lead 79 project through the concavities of respective channel sections, they are shown as being multi-filar winding sections with the related channel-inductors. Specifically, the convolutions of winding section 96 are interposed with the turns of inductor 90, sections of winding 98 are associated with inductors 92 and 95 and the portions of winding 97 are associated with inductors 93 and 94.

Figure 5:
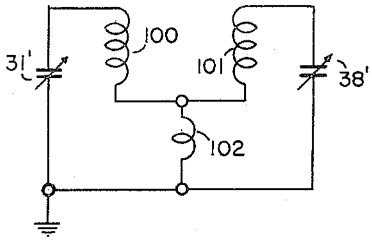
Fig. 5 is an electrical circuit equivalent of the circuit of Fig. 4.

It may be shown by well-known electrical transformations that the complex network including inductors 22, 23 and 90—95 may be resolved into the simple T arrangement of Fig. 5 including inductors 100, 101 and 102. Element 102 constitutes the vertical branch of the T network and is in common circuit connection with each of the coils 100 and 101 (or coils 22 and 23). Consequently, it serves as a common coupling impedance of an inductive character which remains substantially constant throughout the operating frequency of the tuner despite the presence of stray capacitances.

Since the conductors of line 62 are in effect interwound (96) with inductor 90, the channel counterpart of which has an effective electrical length less than one-quarter of the operating wavelength, the shunting effect of stray capacitances on common coupling impedance 102 is minimized. This occurs because the potential to ground along the conductors is caused to vary in accordance with that of inductor 90. Similarly, lead 79 (inductor sections 98) is raised above ground potential as a result of being effectively interwound with inductor 92 and lead 63 (inductor sections 97) is above ground potential because of its being effectively interwound with inductor 93.

If any of the afore-mentioned leads were not disposed within its associated channel section, it is obvious that the capacitance to ground of the lead would be shunted across the common coupling impedance and a purely inductive coupling could not be achieved. The band width of the coupled circuits would then be adversely affected, specifically, the band width would not be maintained at a determinable and selected value throughout the operating range of the tuner. The frequency-selective electrical network in accordance with the invention obviates this difficulty and provides a given percentage frequency-acceptance band through its operating range of frequencies.

In a practical embodiment of the tuner, silver-plated iron was used for chassis 10, shields 14—16, carriage 45 and bearing member 52. Chassis 10 of that unit was 5 inches long by 3 inches wide and the over all height from shields 66 and 69 to the upper ends of screws 49 was 4¼ inches. It is apparent, therefore, that the tuner is extremely compact.

That tuner is continuously adjustable in frequency from approximately 500 mcs. to 890 mcs., oscillator 75 operating on the high side of the incoming signal frequency to derive an intermediate frequency of 41.25 mcs. The performance of the tuner is excellent with respect to sensitivity, noise factor, image rejection and frequency drift notwithstanding the small size of the unit. Moreover, it may be observed from Fig. 1 that the tuner is very well shielded to minimize oscillator radiation.

Figure 6:
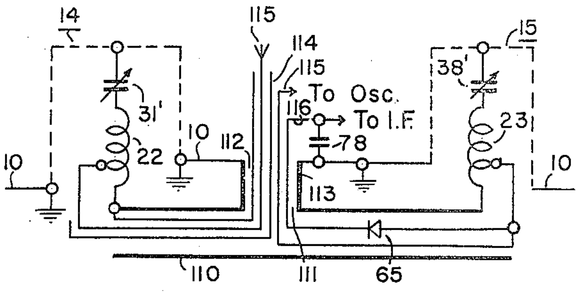
Fig. 6 is a schematic circuit diagram of a modification of the instant invention; and, Fig. 7 shows an electrical circuit equivalent of the circuit represented in Fig. 6.

In the modified arrangement of Fig. 6, there is included a frequency-selective electrical network similar in some respects to that of Fig. 3, like elements being designated by identical reference numerals. An elongated, hollow member 110 is disposed below base 10 and is connected at its ends to the lower extremities of coils 22 and 23. Member 110 preferably is of U-shaped channel configuration similar to member 56 of Figs. 1–3. An opening 111 in the bight portion of the channel intermediate its ends is in registry with a similar opening 112 in chassis 10 disposed between shields 14 and 15. A hollow conductive bushing 113, positioned between channel 110 and chassis 10 in alignment with openings 111 and 112 is mechanically and electrically connected to the chassis and the channel. A coaxial type antenna cable 114 having an unbalanced antenna system 115 coupled to one end thereof projects through opening 112, bushing 113, opening 111 and the left portion of channel 110 into coupled relation with coil 22. Specifically, the outer conductor of cable 114 is connected to the junction of coil 22 with member 110 and the center conductor is connected to a tap of coil 22. Output leads designated 115 and 116 extend from a tap of coil 23 through the right portion of channel 110 through opening 111, bushing 113 and opening 112, lead 116 being connected to the coil tap through mixer crystal 65.

Figure 7:
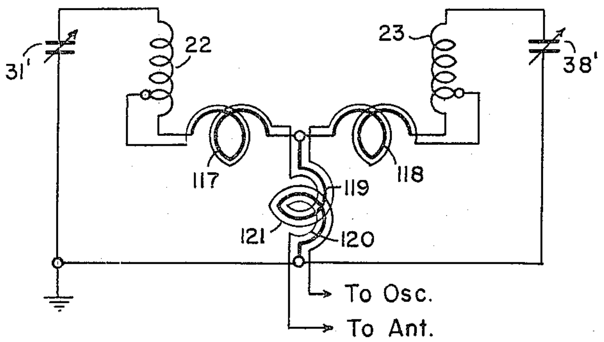

In the electrical circuit equivalent of Fig. 6 shown in Fig. 7, member 110 is represented by a pair of inductors 117 and 118 connected in series and to the lower extremities of coils 22 and 23. An inductor 119 connected between the junction of inductors 117 and 118 and ground represents bushing 113. It may be observed that inductor 119 is a common coupling impedance for the resonant circuits which individually include coils 22 and 23. Moreover, input and output leads such as 114 and 115 are effectively interwound as coils 120 and 121 with the inductor 119 which represents the common coupling impedance to minimize the shunting effect of circuit and lead capacitances to ground on impedance 119. The operation of this embodiment will be readily understood from the afore-described operation of the circuit of Figs. 4 and 5 and the advantages outlined in connection therewith are also achieved in this embodiment.

While particular embodiments of the present invention have been shown and described, it will be obvious to those skilled in the art that changes and modifications may be made therein, and, therefore, the aim in the appended claims is to cover all such changes and modifications as fall within the true spirit and scope of the invention.

We claim:

1. A high-frequency wave-signal translating system comprising: an input circuit including a first principal lumped inductance and a tuning capacitance; an output circuit including a second principal lumped inductance and a tuning capacitance, said second inductance being disposed adjacent and in parallel relation with said first inductance; a source of local oscillations including a third principal lumped inductance disposed adjacent and in parallel relation with said second inductance; a coupling impedance common to both of said circuits to provide coupling therebetween and consisting essentially of an elongated, conductive channel member positioned to intercept the longitudinal axes of said first, second and third inductances, and having sections between each adjacent pair of said axes individually of an effective electrical length small relative to one-quarter of the operating wavelength; a lead-in conductor for connecting a signal source to said input circuit, said conductor projecting through the concavity of said channel member into coupled relation with said first principal inductance; and a frequency-changing device disposed within the concavity of said channel member and coupled between said second and third inductances.

2. A high-frequency wave-signal translating system comprising: an input circuit having at least two terminals and including a first principal inductance and a tuning capacitance; an output circuit having at least two terminals and including a second principal inductance disposed adjacent and in parallel relation with said first inductance, and a tuning capacitance; a source of local oscillations including a third principal inductance disposed adjacent and in parallel relation with said second inductance; an electrically conductive shield structure, magnetically and electrostatically isolating said principal inductances from one another, electrically connected to one terminal of each of said input and output circuits; a coupling impedance comprising an elongated, conductive channel member positioned to intercept the longitudinal axes of said first, second and third inductances, connected at spaced points intermediate its ends to the other terminal of each of said input and output circuits, connected at one end to said shield structure and further connected at a point intermediate its other end and the connection with said output circuit to said shield structure, said member having an effective electrical length between the connection to said shield structure and each of the connections to said input and output circuits small relative to one-quarter of the operating wavelength and providing coupling between said input and output circuits; a lead-in conductor for connecting a signal source to said input circuit, said conductor projecting through the portion of the concavity of said channel member between its end connection with said shield structure and its connection with said input circuit into coupled relation with said first principal inductance; a frequency-changing device disposed within the concavity of said channel member and coupled to said second principal inductance; and another conductor projecting through the portion of the concavity of said channel member between its aforesaid other end and said frequency-changing device and coupling said third inductance of said source of local oscillations with said frequency-changing device.

3. A high-frequency wave-signal translating system comprising: a conductive, essentially planar mounting base having first, second and third lead-receiving openings disposed in the recited order; an input circuit including a first principal lumped inductance, aligned with said first opening and projecting from one side of said base, and a tuning capacitance; an output circuit including a second principal lumped inductance, aligned with said second opening and projecting from one side of said mounting base, and a tuning capacitance; a source of local oscillations including a third principal lumped inductance aligned with said third opening and projecting from said one side of said mounting base; a coupling impedance common to both of said input and output circuits to provide coupling therebetween and comprising an elongated, conductive channel member positioned adjacent the other side of said base and extending along the line of said openings, said member having sections between each adjacent pair of said openings individually of an effective electrical length small relative to one-quarter of the operating wavelength; a lead-in conductor for connecting a signal source to said input circuit, said conductor projecting through the concavity of said channel member and said first opening in said mounting base into coupled relation with said first principal inductance; a frequency-changing device disposed within the concavity of said channel member; conductive leads projecting through said second and third openings in said mounting base coupling together said second and third inductances through said frequency-changing device; and a conductive shield member disposed adjacent the aforesaid other side of said mounting base, electrically connected thereto and completing therewith a shield enclosure for said channel member.

4. A frequency-selective electrical network for utilizing radio-frequency signals comprising: a first circuit including a principal lumped inductance and a tuning capacitance; a second circuit including a principal lumped inductance and a tuning capacitance; a lead-in conductor coupled to said first circuit for applying said radio-frequency signals to said first circuit; and a coupling impedance including at least two sections each having an electrical length small relative to one-quarter of the wavelength of said signals, the first of said sections being conductively connected in series relationship between said first and second circuits and the other of said sections being connected between said first section and a plane of reference potential, said coupling impedance consisting essentially of a continuous conductive element at least partially encompassing said lead-in conductor.

5. A frequency-selective electrical network for utilizing radio frequency signals comprising: a first circuit having at least two terminals and including a principal lumped inductance and a tuning capacitance; a second circuit having at least two terminals and including a principal lumped inductance and a tuning capacitance; a lead-in conductor coupled to said first circuit for applying said radio-frequency signals to said first circuit; an electrically conductive shield structure, magnetically and electrostatically isolating said principal inductances from one another, electrically connected to one terminal of each of said circuits; and a coupling impedance including at least two sections each having an electrical length small relative to one-quarter of the wavelength of said signals, the first of said sections being conductively connected in series relationship between the other terminals of said first and second circuits, and the second of said sections being connected between said first section and said shield structure, said coupling impedance consisting essentially of a continuous conductive element at least partially encompassing said lead-in conductor.

References Cited in the file of this patent

UNITED STATES PATENTS

| | | |
|---|---|---|
| 2,132,208 | Dunmore | Oct. 4, 1938 |
| 2,149,387 | Brown | Mar. 7, 1939 |
| 2,152,335 | Trevor et al. | Mar. 28, 1939 |
| 2,175,710 | Usselman et al. | Oct. 10, 1939 |
| 2,203,329 | Goldman | June 4, 1940 |
| 2,220,922 | Trevor | Nov. 12, 1940 |
| 2,272,062 | George | Feb. 3, 1942 |
| 2,277,638 | George | Mar. 24, 1942 |
| 2,284,529 | Mason | May 25, 1942 |
| 2,311,522 | Conron et al. | Feb. 16, 1943 |
| 2,423,797 | Reber | July 8, 1947 |
| 2,436,830 | Sharpless | Mar. 2, 1948 |
| 2,472,196 | Cork | June 7, 1949 |
| 2,474,026 | Atwood et al. | June 21, 1949 |
| 2,516,887 | Lehmann | Aug. 1, 1950 |
| 2,556,119 | Stribling | June 5, 1951 |